US012586083B2

(12) United States Patent
Butrum et al.

(10) Patent No.: US 12,586,083 B2
(45) Date of Patent: Mar. 24, 2026

(54) SYSTEMS AND METHODS FOR CONTROLLER UPDATING AND CONFIGURING EMISSION CERTIFICATION LEVEL ENFORCEMENT

(71) Applicant: Cummins Inc., Columbus, IN (US)

(72) Inventors: Angela N. Butrum, Columbus, IN (US); Sunil Dhulipati, Indianapolis, IN (US); Shantilal Dayama, Columbus, IN (US); Christian P. Gaya, Naples, FL (US); Jon E. Krutulis, Columbus, IN (US); Rama Krishna Nimmagadda, Waterloo (CA); Deepthi Uppala, Greenwood, IN (US); Ryan A. Scott, Columbus, IN (US)

(73) Assignee: Cummins Inc., Columbus, IN (US)

( * ) Notice: Subject to any disclaimer, the term of this patent is extended or adjusted under 35 U.S.C. 154(b) by 169 days.

(21) Appl. No.: 18/276,390

(22) PCT Filed: Feb. 8, 2022

(86) PCT No.: PCT/US2022/015664
§ 371 (c)(1),
(2) Date: Aug. 8, 2023

(87) PCT Pub. No.: WO2022/173751
PCT Pub. Date: Aug. 18, 2022

(65) Prior Publication Data
US 2024/0112200 A1 Apr. 4, 2024

(30) Foreign Application Priority Data
Feb. 9, 2021 (IN) .............................. 202141005492

(51) Int. Cl.
*G06Q 30/018* (2023.01)

(52) U.S. Cl.
CPC .................................. *G06Q 30/018* (2013.01)

(58) Field of Classification Search
CPC .................................................... G06Q 30/018
(Continued)

(56) References Cited

U.S. PATENT DOCUMENTS

| | | | |
|---|---|---|---|
| 5,787,367 A | 7/1998 | Berra | |
| 5,865,026 A * | 2/1999 | Davey | ................... F01N 11/002 |
| | | | 60/276 |

(Continued)

FOREIGN PATENT DOCUMENTS

| | | |
|---|---|---|
| CN | 101360904 A | 2/2009 |
| CN | 103597332 A | 2/2014 |

(Continued)

OTHER PUBLICATIONS

"Calibration of a microscopic simulation model for emission calculation" Published by Elsevier (Year: 2013).*
(Continued)

*Primary Examiner* — Zeina Elchanti
(74) *Attorney, Agent, or Firm* — Foley & Lardner LLP

(57) ABSTRACT

A system includes an exhaust aftertreatment system coupled to an engine and a controller. The controller includes at least one processor coupled to at least one memory device storing instructions that, when executed by the at least one processor, cause the controller to perform operations including: determine an intended emissions level calibration parameter; receive a new emissions level calibration parameter; compare the intended emissions level calibration parameter to the new emissions level calibration parameter; and generate an alert based on the comparison.

14 Claims, 5 Drawing Sheets

(58) Field of Classification Search
USPC ........................................................ 705/317
See application file for complete search history.

(56) References Cited

U.S. PATENT DOCUMENTS

| | | | |
|---|---|---|---|
| 5,884,210 | A | 3/1999 | Rettig et al. |
| 6,112,151 | A | 8/2000 | Kruse |
| 6,571,191 | B1 | 5/2003 | York et al. |
| 7,522,994 | B2 | 4/2009 | Durand |
| 7,729,824 | B2 | 6/2010 | Tolkacz |
| 8,484,752 | B2 | 7/2013 | Traenkenschuh et al. |
| 9,243,581 | B2 | 1/2016 | Light-Holets |
| 9,803,610 | B2 | 10/2017 | Hall et al. |
| 9,920,733 | B2 | 3/2018 | Hall et al. |
| 10,167,794 | B2 | 1/2019 | Kraemer et al. |
| 2006/0041370 | A1 | 2/2006 | Gault et al. |
| 2009/0171549 | A1 | 7/2009 | Hyde et al. |
| 2010/0023292 | A1* | 1/2010 | Willard ................. G01D 18/00 |
| | | | 702/89 |
| 2010/0043400 | A1* | 2/2010 | Wang ................... F01N 11/002 |
| | | | 60/299 |
| 2011/0056185 | A1 | 3/2011 | Bradley et al. |
| 2014/0277904 | A1 | 9/2014 | Schankula et al. |
| 2015/0088362 | A1 | 3/2015 | See et al. |
| 2018/0198846 | A1* | 7/2018 | Srinivasan ............ H04L 63/083 |
| 2019/0107063 | A1 | 4/2019 | Brier et al. |
| 2019/0241170 | A1 | 8/2019 | Tran et al. |
| 2020/0116068 | A1 | 4/2020 | Hall et al. |

FOREIGN PATENT DOCUMENTS

| | | |
|---|---|---|
| CN | 109792432 A | 5/2019 |
| DE | 10-2011-103699 A1 | 12/2012 |
| WO | WO-2011/029004 A1 | 3/2011 |

OTHER PUBLICATIONS

PCT International Search Report and Written Opinion for International Application No. PCT/US2022/015664 mailing date May 4, 2022, 10 pages.

Extended Search Report on corresponding EP Patent Application No. 22753211.6, issued Dec. 3, 2024, 10 pages.

First Office Action issued for Chinese Patent Application No. 202280013801.4 issued Aug. 23, 2025, 9 pages.

* cited by examiner

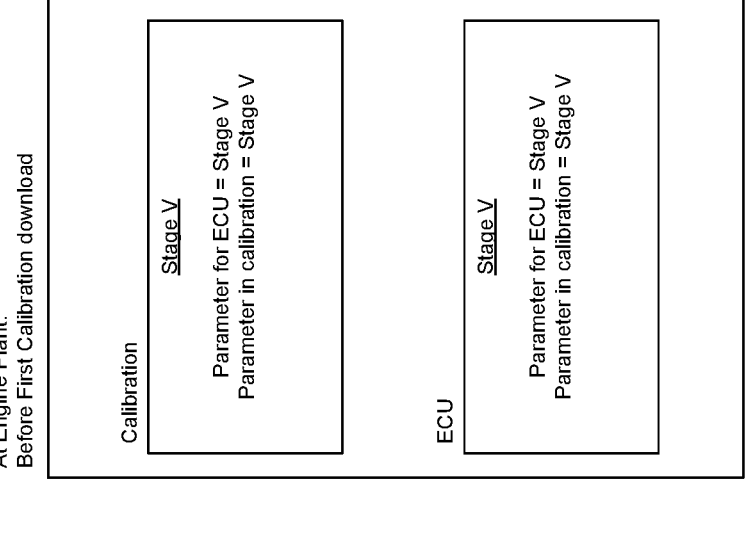

At Engine Plant:
Before First Calibration download

Calibration

Stage V

Parameter for ECU = Stage V
Parameter in calibration = Stage V

ECU

- blank -

Fig. 3A

At Engine Plant:
Before First Calibration download

Calibration

Stage V

Parameter for ECU = Stage V
Parameter in calibration = Stage V

ECU

Stage V

Parameter for ECU = Stage V
Parameter in calibration = Stage V

Fig. 3B

Subsequent Calibration updates

Calibration

Stage V

Parameter for ECU = Stage V
Parameter in calibration = Stage V

ECU

Stage V

Parameter for ECU = Stage V
Parameter in calibration = Stage V

Fig. 3C

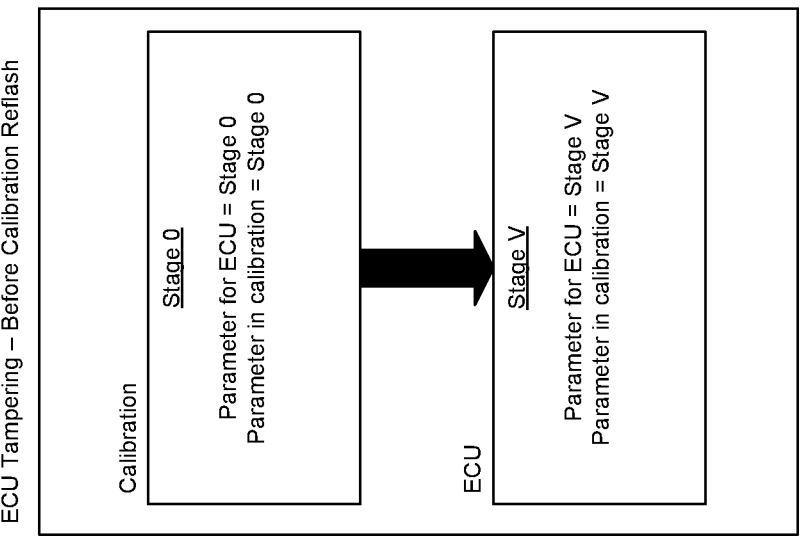

ECU Tampering – Before Calibration Reflash

ECU Restores parameter

Parameter in ECU = Stage V
Parameter from calibration = Stage 0

ECU check for match

Parameter for ECU ≠
Parameter from calibration

Set Fault and restrict engine performance

Fig. 3E

ECU Tampering – Before Calibration Reflash

Calibration

Stage 0

Parameter for ECU = Stage 0
Parameter in calibration = Stage 0

ECU

Stage V

Parameter for ECU = Stage V
Parameter in calibration = Stage V

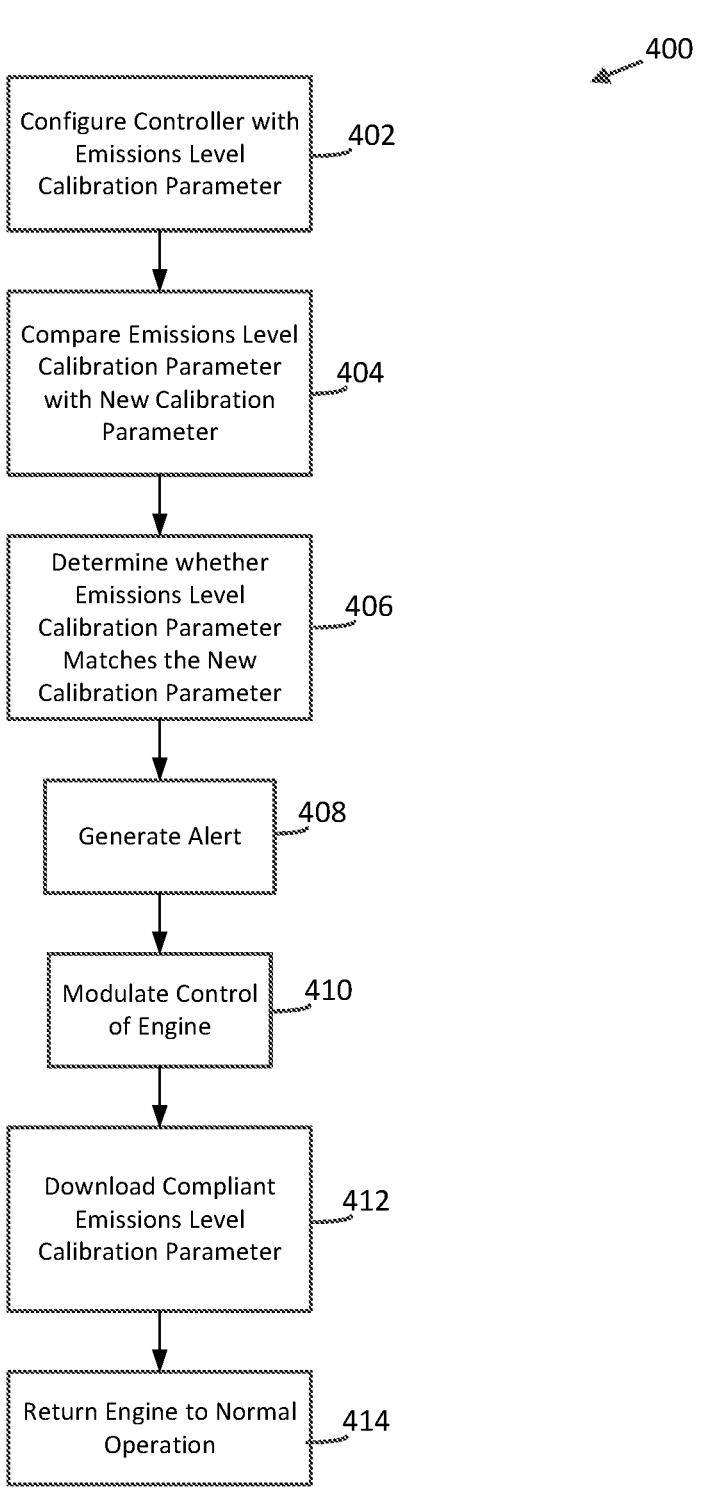

Configure Controller with
Emissions Level
Calibration Parameter          402

Compare Emissions Level
Calibration Parameter
with New Calibration
Parameter          404

Determine whether
Emissions Level
Calibration Parameter
Matches the New
Calibration Parameter          406

Generate Alert          408

Modulate Control
of Engine          410

Download Compliant
Emissions Level
Calibration Parameter          412

Return Engine to Normal
Operation          414

Fig. 4

SYSTEMS AND METHODS FOR CONTROLLER UPDATING AND CONFIGURING EMISSION CERTIFICATION LEVEL ENFORCEMENT

CROSS REFERENCE TO RELATED APPLICATION

This application claims the benefit of and priority to Indian Provisional Patent Application No. 202141005492, filed on Feb. 9, 2021, the entire contents of which are incorporated herein by reference.

TECHNICAL FIELD

The present disclosure relates to configuring and updating controller(s) for detecting emissions tampering and enforcing emissions compliance in various systems (e.g., vehicles including aftertreatment systems).

BACKGROUND

Many engines are coupled to an exhaust aftertreatment system that reduces harmful exhaust gas emissions (e.g., nitrous oxides (NOx), sulfur oxides, particulate matter, etc.). For example, a reductant may be injected into the exhaust stream to chemically bind to particles in the exhaust gas. This mixture interacts with a Selective Catalytic Reduction (SCR) catalyst that, at a certain temperature, causes a reaction in the mixture that converts the harmful NOx particles into pure nitrogen and water. Emissions levels are highly regulated in various markets. Thus, the emissions on each vehicle must be monitored and verified during normal operation in order to ensure compliance or substantial compliance.

Diesel engine manufacturers have a global market with various regions having different emission regulations. Some markets have more stringent regulations than others. A common approach to save costs and ensure compliance is to create and maintain many variations of similar engines. While this practice may reduce an individual product selling price, it requires additional research and development for each product. Further, part proliferation occurs thereby requiring a complex system of part sourcing and storage. Significant amounts of effort have to be given to ensure each of these products meets internal standards, all with potentially unique criteria. Accordingly, it can be costly to correct purchase orders when incorrect products are sent to customers. Further, it is difficult to ensure that various engine-exhaust aftertreatment systems do not accidently or maliciously receive updates that negate the emission regulations is originally intended for the system.

SUMMARY

One embodiment relates to a system including an exhaust aftertreatment system coupled to an engine and a controller. The controller includes at least one processor coupled to at least one memory device storing instructions that, when executed by the at least one processor, cause the controller to perform operations including store an intended emissions level calibration parameter, receive a new emissions level calibration parameter, compare the intended emissions level calibration parameter to the new emissions level calibration parameter, and generate an alert based on the comparison.

Another embodiment relates to an apparatus including one or more processing circuits comprising one or more memory devices coupled to one or more processors. The one or more memory devices are configured to store instructions thereon that, when executed by the one or more processors, cause the one or more processors to: receive an original emissions level calibration parameter; store the original emissions level calibration parameter in a secure location of the one or more memory devices; receive a flash or erase data command; and restore the original emissions level calibration parameter after receiving the flash or erase data command.

Another embodiment relates to a system including an exhaust aftertreatment system and a controller coupled to the exhaust aftertreatment system. The controller is configured to: receive an original emissions level calibration parameter; store the original emissions level calibration parameter in a secure location of the controller; receive a requested recalibration parameter; determine a requested emissions level calibration parameter associated with the requested recalibration parameter; compare the requested emissions level calibration parameter and the original emissions level calibration parameter; implement an inducement when the requested emissions level calibration parameter does not comply with the original emissions level calibration parameter; implement the requested recalibration parameter when the requested emissions level calibration parameter complies with the original emissions level calibration parameter; receive a flash or erase data command; and restore the original emissions level calibration parameter after receiving the flash or erase data command.

Another embodiment relates to a method including receiving an original emissions level calibration parameter, storing the original emissions level calibration parameter in a secure location of the controller, receiving a requested recalibration parameter, determining a requested emissions level calibration parameter associated with the requested recalibration parameter, comparing the requested emissions level calibration parameter and the original emissions level calibration parameter, implementing an inducement based on the comparison of the requested emissions level calibration parameter and the original emissions level calibration parameter, implementing the requested recalibration parameter when the requested emissions level calibration parameter complies with the original emissions level calibration parameter, receiving a flash or erase data command, and restoring the original emissions level calibration parameter after receiving the flash or erase data command.

This summary is illustrative only and is not intended to be in any way limiting. Other aspects, features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIGS. 3A-3E are block diagrams of a process that may be implemented by the calibration logic and the engine circuit of the controller of FIGS. 1-2, according to an example embodiment.

FIG. 4 is a flow diagram of a method of enforcing an emissions certification level of a vehicle, according to an example embodiment.

DETAILED DESCRIPTION

Figure 1:
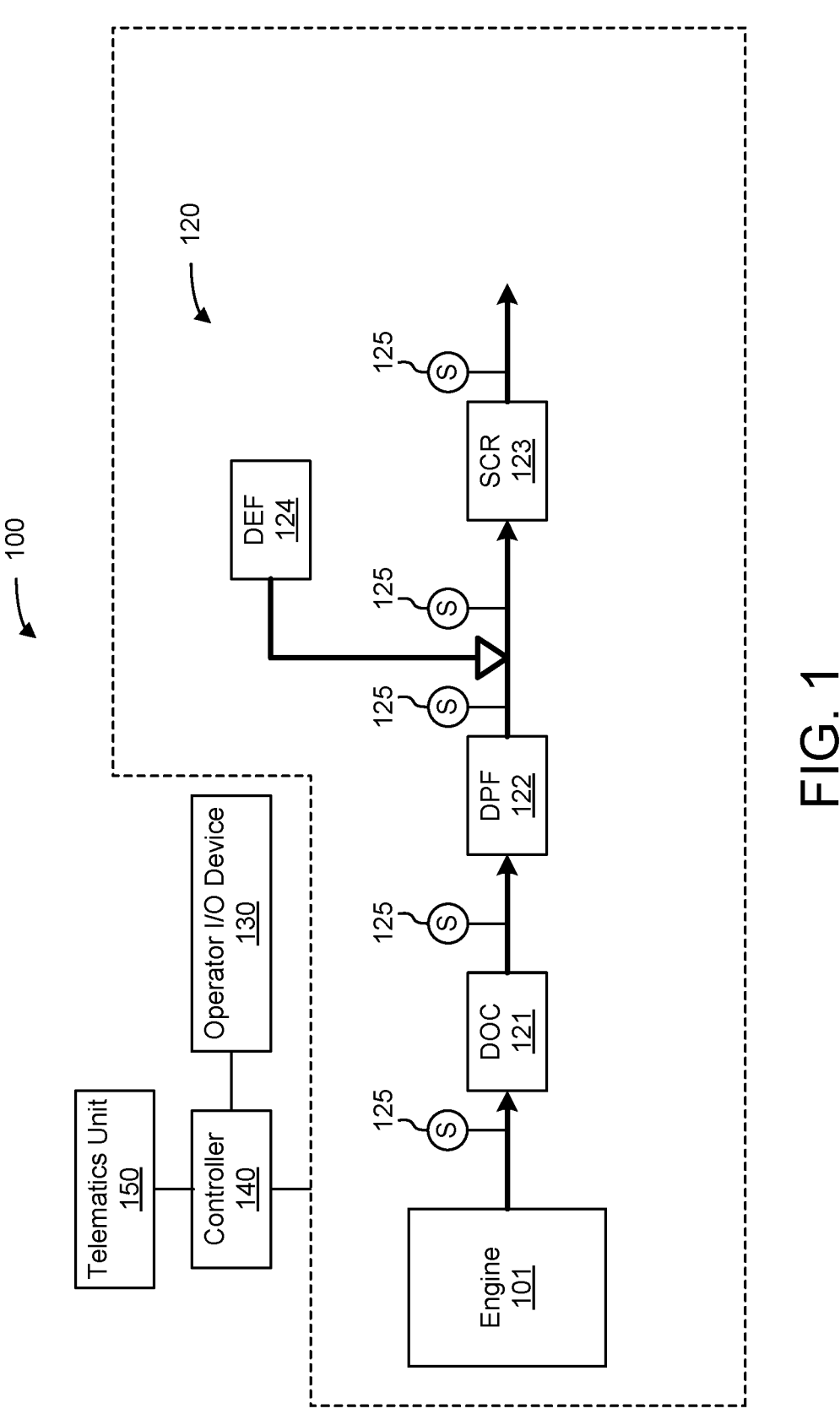
FIG. 1 is a schematic view of a block diagram of a vehicle system, according to an example embodiment.

Following below are more detailed descriptions of various concepts related to, and implementations of, methods, apparatuses, and systems for detecting emissions tampering and enforcing emissions regulations in various systems. Before turning to the figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Current systems include different control modules and different hardware for different regulations (e.g., emissions regulations). Typically, each new emissions regulation requires different hardware which creates difficulty when a user is operating an engine in a region with different regulations than the regulations originally calibrated for the engine. In this situation, a user with an engine having no emission regulations would need to submit an official request for validation and authorization to operate that engine with a non-certified Electronic Control Unit (ECU) calibration and have that calibration downloaded on the approved authorized ECUs. As can be appreciated, restricting these calibrations to specific serial numbers is only viable for a small volume.

Referring to the Figures generally, systems and methods for detecting emissions tampering and enforcing emissions regulations in various systems are shown and described herein according to various embodiments. A controller is provided that is coupled to the engine and a variety of other components in a system. When an engine is built at the manufacturing plant, a label (e.g., emissions level calibration parameter, first or intended emissions parameter, data packet or packet, or value, etc.) is written or programmed into the controller. The emissions level calibration parameter indicates the intended emissions tier compliancy level for the engine (the tiers correspond with different allowed emissions amount, such as NOx emissions below Level 1 or NOx emissions below Level 2 which is greater than Level 1). However, a concern is that a recalibration may enable less stringent emissions from the engine system thereby potentially allowing non-compliance with one or more regulations. Once the engine is out in the field, the controller monitors the emissions level calibration parameter. For instance, if a user tries to recalibrate the controller and change the emissions level calibration parameter, the controller checks if the new calibration is on the same emissions levels as the original configured engine (e.g., by comparing the originally written emissions level calibration parameter with the emissions label in the new calibration package). If the emissions labels match, the controller enables the recalibration (i.e., allows normal engine operation with the new calibration). If the emission labels do not match, the controller may institute one or more actions to prevent the engine from operating normally (e.g., a derate, etc.). By utilizing an emissions calibration label or value that is permanently or substantially permanently stored in the memory of the controller, the controller may thwart tampering by comparing new emissions level calibration parameters to the stored emissions level calibration value, even in the event of a complete controller re-boot or reflash.

The system and method of the present disclosure may simplify the manufacturing processes (e.g., assembly lines) by using the same base engine hardware to offer engines at multiple emissions certification levels. Further, the controller detects emissions tampering and enforces emissions regulations by only allowing the calibration(s) authorized for the application. As such, the present disclosure advantageously provides one product that can meet multiple emissions regulations and a protective mechanism to prevent a customer from downloading a non-compliant calibration (intentionally or unintentionally) into their equipment. Further, the present disclosure enables engines to be certified to different emission levels, to be exported to alternate markets, using the same base engine hardware. A single chassis may be developed for multiple markets with different emissions regulations. Having a common base engine, controller (e.g., (ECU)), and wiring harness is greatly beneficial to users at the manufacturing stage and the operating stage.

Referring now to FIG. 1, a system 100 is illustrated according to an exemplary embodiment. The system 100 includes an engine 101, an aftertreatment system 120, an operator I/O device 130, a controller 140, and a telematics unit 150. According to one embodiment and as shown, the system 100 is embodied in a vehicle. In various alternate embodiments, as described above, the controller 140 may be used with any engine system and/or any engine-exhaust aftertreatment system (e.g., a power generator). The vehicle may include an on-road or an off-road vehicle including, but not limited to, line-haul trucks, mid-range trucks (e.g., pick-up trucks), sedans, coupes, etc. Additional off-highway applications can include tanks, airplanes, boats, power generators or gensets, construction equipment (e.g., excavators, wheel loaders, cranes, forklifts, etc.), agricultural equipment (e.g., tractors, combines, sprayer, etc.), and so on. However, the system may also be implemented with stationary pieces of equipment like power generators or gen-sets. In the example shown, the system 100 is embodied in a line-haul truck.

Further and in the example shown, the engine 101 is structured as a compression-ignition internal combustion engine that utilizes diesel fuel. However, in various alternate embodiments, the engine 101 may be structured as another type of engine (e.g., spark-ignition) that utilizes another type of fuel (e.g., gasoline, natural gas). In still other example embodiments, the engine 101 may be or include an electric motor (e.g., a hybrid drivetrain). The engine 101 includes one or more cylinders and associated pistons. Air from the atmosphere is combined with fuel, and combusted, to power the engine 101. Combustion of the fuel and air in the compression chambers of the engine 101 produces exhaust gas that is operatively vented to an exhaust pipe and to the aftertreatment system 120.

The aftertreatment system 120 is coupled to the engine 101. It should be understood that the schematic depicted in FIG. 1 is but one implementation of an engine exhaust aftertreatment system. Many different configurations may be implemented that utilize the systems and methods described herein. In some embodiments, the present disclosure may be used with internal combustions in general (e.g., both including and excluding exhaust aftertreatment systems). Accordingly, while the system and method described herein are primarily directed to engine exhaust aftertreatment systems, it should be understood that the system and method of the present disclosure may be used in a variety configurations that include and exclude aftertreatment systems, such that the embodiment depicted in FIG. 1 is not meant to be limiting.

The aftertreatment system 120 is structured to treat exhaust gases from the engine 101, which enter the aftertreatment system 120 via an exhaust pipe, in order to reduce the emissions of harmful or potentially harmful elements (e.g., NOx emissions, particulate matter, SOx, CO, greenhouse gases, etc.). The aftertreatment system 120 may include various components and systems, such as a diesel oxidation catalyst (DOC) 121, a diesel particulate filter (DPF) 122, and a selective catalytic reduction (SCR) system 123. The SCR 123 converts nitrogen oxides present in the exhaust gases produced by the engine 101 into diatomic nitrogen and water through oxidation within a catalyst. The DPF 122 is configured to remove particulate matter, such as soot, from exhaust gas flowing in the exhaust gas conduit system. In some implementations, the DPF 122 may be omitted. Also, the spatial order of the catalyst elements may be different.

The aftertreatment system 120 may further include a reductant delivery system which may include a decomposition chamber (e.g., decomposition reactor, reactor pipe, decomposition tube, reactor tube, etc.) to convert the reductant (e.g., urea, diesel exhaust fluid (DEF), Adblue®, a urea water solution (UWS), an aqueous urea solution, etc.) into ammonia. A diesel exhaust fluid (DEF) 124 is added to the exhaust gas stream to aid in the catalytic reduction. The reductant may be injected by an injector upstream of the SCR catalyst member such that the SCR catalyst member receives a mixture of the reductant and exhaust gas. The reductant droplets undergo the processes of evaporation, thermolysis, and hydrolysis to form non-NOx emissions (e.g., gaseous ammonia, etc.) within the decomposition chamber, the SCR catalyst member, and/or the exhaust gas conduit system, which leaves the aftertreatment system 120. The aftertreatment system 120 may further include an oxidation catalyst (e.g., the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is between 200 degrees C. and 500 degrees C. In other embodiments, the certain operating temperature is the temperature at which the conversion efficiency of the DOC 121 exceeds a predefined threshold (e.g., the conversion of NOx to less harmful compounds, which is known as the NOx conversion efficiency).

As shown, a plurality of sensors 125 are included in the aftertreatment system 120. The number, placement, and type of sensors included in the aftertreatment system 120 is shown for example purposes only. In other configurations, the number, placement, and type of sensors may differ. The sensors 125 may be NOx sensors, temperature sensors, particulate matter (PM) sensors and/or other emissions constituents sensors. The NOx sensors are structured to acquire data indicative of a NOx amount at each location that the NOx sensor is located. The temperature sensors are structured to acquire data indicative of a temperature at their locations. The PM sensors are structured to monitor particulate matter flowing through the aftertreatment system 120. The sensors 125 may be located after the engine 101, after the aftertreatment system 120, and in between the aftertreatment system components as shown, but it should be understood that the location of the sensors may vary. The controller 140 is communicably coupled to each of the sensors 125 in the aftertreatment system 120. Accordingly, the controller 140 is structured to receive data from one more of the sensors 125. The received data may be used by the controller 140 to control one more components in the system 100 and/or for monitoring and diagnostic purposes.

The sensors may be real or virtual (i.e., a non-physical sensor that is structured as program logic in the controller that makes various estimations or determinations). For example, an emissions sensor may be a real or virtual sensor arranged to measure or otherwise acquire data, values, or information indicative of an emissions level of the aftertreatment system 120. The sensor is coupled to the engine (when structured as a real sensor), and is structured to send a signal to the controller 140. When structured as a virtual sensor, at least one input may be used by the controller 140 in an algorithm, model, look-up table, etc. to determine or estimate a parameter of the engine (e.g., power output, etc.). The other sensors may be real or virtual as well. As will be described herein, the sensors 125 and additional sensors may provide data regarding how the particular vehicle system is operating.

Referring still to FIG. 1, an operator input/output (I/O) device 130 is also shown. The operator I/O device 130 may be communicably coupled to the controller 140, such that information may be exchanged between the controller 140 and the I/O device 130, wherein the information may relate to one or more components of FIG. 1 or determinations (described below) of the controller 140. The operator I/O device 130 enables an operator of the system 100 to communicate with the controller 140 and one or more components of the system 100 of FIG. 1. For example, the operator input/output device 130 may include, but is not limited to, an interactive display, a touchscreen device, one or more buttons and switches, voice command receivers, etc. In various alternate embodiments, the controller 140 and components described herein may be implemented with non-vehicular applications (e.g., a power generator). Accordingly, the I/O device may be specific to those applications. For example, in those instances, the I/O device may include a laptop computer, a tablet computer, a desktop computer, a phone, a watch, a personal digital assistant, etc. Via the operator I/O device, the controller 140 may provide diagnostic information, a fault or service notification based on one or more determinations. For example, in some embodiments, the controller 140 may display, via the operator I/O device, a temperature of the DOC 121, a temperature of the engine 101 and the exhaust gas, and various other information.

The controller 140 is structured to control the operation of the system 100 and associated sub-systems, such as the aftertreatment system 120 (and various components of each system), and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

The telematics unit 150 may include, but is not limited to, one or more memory devices for storing tracked data, one or more electronic processing units for processing the tracked data, and a communications interface for facilitating the exchange of data between the telematics unit 150 and one or more remote devices (e.g., a provider/manufacturer of the telematics device, etc.). The telematics unit 150 may facilitate remote updates to the controller 140 (e.g., calibration parameters, trim parameters, complete operating system software/packages, etc.). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 150 may also include a communications interface for communicating with the controller 140 of the system 100. The communication interface for communicating with the controller 140 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 140 and the telematics unit 150. In other embodiments, a local area network (LAN), a wide area network (WAN), or an external computer (for example, through the Internet using an Internet Service Provider) may provide, facilitate, and support communication between the telematics unit 150 and the controller 140. In still another embodiment, the communication between the telematics unit 150 and the controller 140 is via the unified diagnostic services (UDS) protocol. All such variations are intended to fall within the spirit and scope of the present disclosure.

Figure 2:
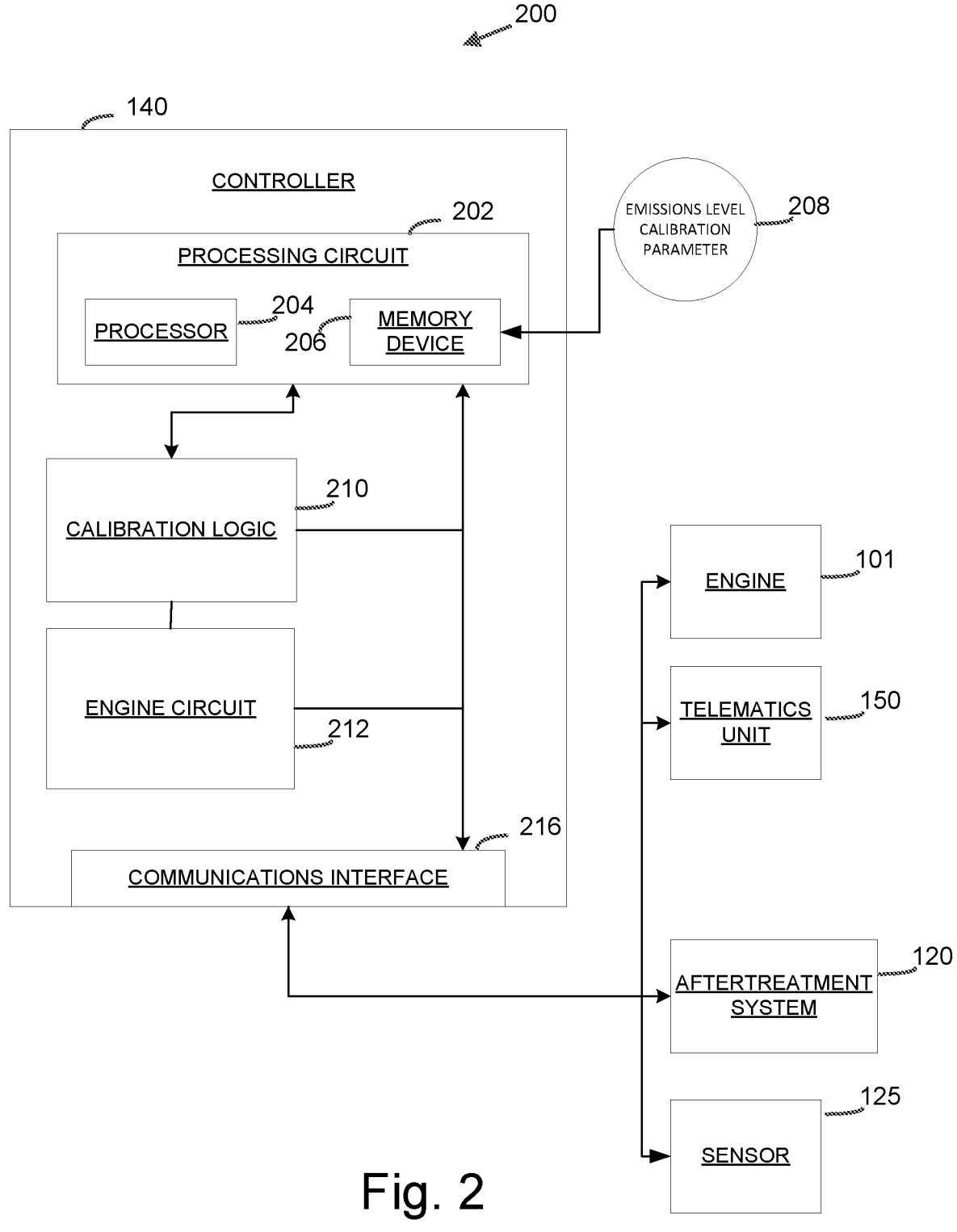
FIG. 2 is a block diagram of the controller of FIG. 1, according to an example embodiment.

Referring now to FIG. 2, a schematic diagram 200 of the controller 140 of the system 100 of FIG. 1 is shown according to an example embodiment. The controller 140 may be structured as one or more electronic control units (ECU). The controller 140 may be separate from or included with at least one of a transmission control unit, an exhaust aftertreatment control unit, a powertrain control module, an engine control module, etc. In one embodiment, the components of the controller 140 are combined into a single unit. In another embodiment, one or more of the components may be geographically dispersed throughout the system. All such variations are intended to fall within the scope of the disclosure. The controller 140 is shown to include a processing circuit 202 having a processor 204 and a memory device 206, calibration logic 210, an engine circuit 212, and a communications interface 216.

In one configuration, the engine circuit 212 is embodied as machine or computer-readable media storing instructions that is executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine circuit 212 is embodied as a hardware unit, such as an electronic control unit. As such, the engine circuit 212 may be embodied as one or more circuitry components including, but not limited to, processing circuitry, network interfaces, peripheral devices, input devices, output devices, sensors, etc. In some embodiments, the engine circuit 212 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The engine circuit 212 may also include programmable hardware devices such as field programmable gate arrays, programmable array logic, programmable logic devices or the like. The engine circuit 212 may include one or more memory devices for storing instructions that are executable by one or more processor(s). The one or more memory devices and processor(s) may have the same definition as provided below with respect to the memory device 206 and processor 204. In some hardware unit configurations and as described above, components of the engine circuit 212 may be geographically dispersed throughout separate locations in the system. Alternatively and as shown, the engine circuit 212 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the engine circuit 212. The depicted configuration represents the engine circuit 212 as machine or computer-readable media. However, as mentioned above, this illustration is not meant to be limiting as the present disclosure contemplates other embodiments where the engine circuit 212 is configured as a hardware unit. All such combinations and variations are intended to fall within the scope of the present disclosure.

The processor 204 may be implemented as one or more processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the engine circuit 212 and other circuits of the system 100 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server, such as via the telematics unit). For example and regarding out-of-vehicle/system communications, the communications interface 216 may include an Ethernet card and port for sending and receiving data via an Ethernet-based communications network and/or a Wi-Fi transceiver for communicating via a wireless communications network (via the telematics unit). The communications interface 216 may be structured to communicate via local area networks or wide area networks (e.g., the Internet) and may use a variety of communications protocols (e.g., IP, LON, Bluetooth, ZigBee, radio, cellular, near field communication). The communications interface 216 may facilitate coupling to computing devices, such as OBD tools, that enable updating/changing of the calibration parameters, trim parameters, and/or operating system for the controller 140.

The communications interface 216 may facilitate communication between and among the controller 140 and one or more components of the system 100 (e.g., the engine 101, the aftertreatment system 120, the sensors 125 etc.). Communication between and among the controller 140 and the components of the system 100 may be via any number of wired or wireless connections (e.g., any standard under IEEE). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The calibration logic 210 is structured to facilitate updating, adjusting, and changing one or more calibration parameters, trim parameters, and/or the software operating system (or other software features) of the controller. The calibration logic 210 may be structured as one or more programs or instructions stored by the memory device 206. The calibration logic 210 facilitates reflashing of the controller 140, changing trim parameters, calibration parameters, and/or performing various software updates. The calibration logic 210 is structured to receive one or more calibration parameters (e.g., the emissions level calibration parameter 208) and trim parameters. A "trim parameter" refers to an electronic operational setting for, e.g., the engine or a component of the system that may be adjustable by an operator or a technician. In comparison, a "calibration parameter" is typically a setting that is non-adjustable by either the operator or a technician. An example of a calibration parameter is an allowable engine temperature before causing at least one of shutting the engine down, a derate event, and triggering an indicator light. Another example of a calibration parameter may include an operating condition prescribed by a local, state, or federal mandate (e.g., an acceptable emissions level before causing an engine derate condition). A non-exhaustive list of trim parameters includes: various parameters relating to cruise control (e.g., an upper droop amount, a lower droop amount, etc.); a road speed governor limit (i.e., the maximum allowable road speed of the vehicle); an idle shut down parameter (e.g., an amount of time before an idle engine shuts down); a load based speed control parameter (e.g., a predefined engine speed for certain operating conditions, such as load); a gear down protection parameter for a light load vehicle speed and a heavy load vehicle speed (e.g., maintain the vehicle in the light load or heavy load vehicle speed to promote increased fuel economy by minimizing downshifts to promote operation of the vehicle in a top gear); and, a vehicle acceleration management feature (e.g., to limit acceleration in certain conditions to improve fuel economy). The calibration logic 210 is structured to receive one or more calibration parameters (e.g., the emissions level calibration parameter 208) and trim parameters and store them in the memory for execution/use/implementation by the controller 140. The parameters may be received from the telematics unit 150 (e.g., over the air recalibrating of one or more parameters) or directly from one or more manufacturing computing devices.

The calibration logic 210 is structured to receive an emissions level calibration parameter 208. When the system is manufactured, the calibration logic 210 may write the emissions level calibration parameter 208 to the memory device. Alternatively, the calibration logic 210 may receive the emissions level calibration parameter 208 from a manufacturing computing device and facilitate storage within the controller 140 (e.g., in the memory device).

The emissions level calibration parameter 208 (also referred to as an intended or first emissions calibration parameter, value, data packet, label, and the like) refers to the emissions level or tier assigned to the specific engine, aftertreatment system, and/or engine-aftertreatment system (e.g., an indicator regarding the emissions regulation level to which the calibration software has been tuned to or designed for). The "emissions tier" refers to the assigned or designated emissions standard/regulation and certification requirements of the vehicle or system. This includes the allowable emissions output, which may be based on the type of vehicle, year of the vehicle, the region the vehicle is intended to operate in, etc. The emissions level calibration parameter 208 may be programmed to different emissions level that are existing currently and for expansion in the future if there are any more regulations that come into existence. The emissions level calibration parameter 208 may be associated with one or more algorithms, lookup tables, logic, and the like that define operating parameters of the system 100 in order to aid compliance of the system with the designated emissions level or tier. For example, California Air Resources Board (CARE) may define different emissions regulations than, for example, Wisconsin. Accordingly, the emissions level calibration parameter 208 may differ for systems intended for California than in Wisconsin. Accordingly, the emissions level calibration parameter 208 is tuned, or calibrated, to a specific engine and emissions tier. The emissions level calibration parameter 208 is released to a system which identifies that calibration for a particular use and may be used as a calibration option during manufacturing that conforms to a particular market's emission needs (e.g., the system's intended use market). The parameter (e.g., a label, value, etc.) can take different states that can be calibrated ahead of manufacturing the engine to identify which emissions tier associated with the engine.

The calibration logic 210 stores the emissions level calibration parameter 208 in a secure location of the memory (e.g., a tamper resistant trusted execution environment). The emissions level calibration parameter 208 may be permanently stored in this secure location of the memory such that it is not adjustable except for by a manufacturer or delegate of manufacturer, for instance. As such, even in the event of a recalibration, the emissions level calibration parameter 208 is still retrievable (e.g., non-erasable). In this regard, the emissions level calibration parameter 208 may be more permanent/unchangeable than typical calibration parameters. In this regard and relative to other calibration parameters of the controller 140, the emissions level calibration parameter 208 may include a mandatory save-and-restore property. The mandatory save and restore property of the emissions level calibration parameter 208 indicates that the emissions level calibration parameter 208 is saved across cycles of recalibration and is restored across reflash/new downloads (e.g., of other parameters). In other alternate embodiments, the emissions level calibration parameter 208 may be analogous to typical calibration parameters. In other words, there are two calibration parameters of the controller 140; a first calibration parameter is an unchanging parameter that indicates the emissions level saved and restored since manufacturing, and a second calibration parameter is a recalibratable parameter that may be changed over time via periodic updates. The emissions level calibration parameter 208 is the first type having the save-and-restore functionality property. This property allows the emissions level calibration parameter 208 to always reflect the intended emissions level to which a new emissions level is compared to upon powering on which, among other benefits, may prevent tampering. In operation and as described herein, the updated emissions level calibration parameter should match that of which is set at manufacturing (e.g., the saved and restored value), and a mismatch is flagged as non-compliant upon a non-match. The emissions level calibration parameter 208 and its associated properties may be determined/designated at the time of manufacturing the engine.

As described herein, the controller 140 can store certain pieces of data across calibration updates, which are typically used for service and warranty purposes. During calibration updates, data are restored to previous values after the calibration download has been completed, even in the case of an attempt to reflash/erase data and programs stored by the controller 140. For instance, the emissions level calibration parameter 208 may be stored in a piece of memory not even accessible to recalibration sequences. The calibration logic 210 is configured to store or facilitate storing of the emissions level calibration parameter 208 in the memory at power-down and restore it (i.e., not delete it and be able to locate it) even after the calibration is erased and downloaded. This emissions level calibration parameter, when read by the controller 140 (i.e., calibration logic 210) identifies the emissions level of the intended calibration to which the calibration was tuned. This is the emissions level that the system is intended to meet.

In operation, the calibration logic 210 is structured to receive updates, such as from the telematics unit or directly from manufacturing computing devices (e.g., service tools) to change one or more calibration parameters, trim parameters, and software packages (e.g., operating systems). These updates (changes, etc.) may impact the emissions from the system 100 (e.g., changing when derates occur, changing when regeneration events occur, etc.). Some operators may desire to prioritize performance of the system over the emissions (even if this means non-compliance with one or more standards). To thwart this and maintain or attempt to maintain compliance, the calibration logic 210 is structured to check the emissions level calibration parameter 208 with the new emissions calibration parameters. If the values match, the calibration logic 210 communicates with the engine circuit 212 to allow the engine to operate normally. If the values do not match, the calibration logic 210 sets a fault code and triggers an inducement as required by the emission regulation agencies, which is described further herein. For instance, inducements are designed to offer reduced performance from the engine (e.g., reduced torque, lock the engine speed to the idle speed) to impair normal behavior and induce the operator to take corrective action.

In some embodiments, the calibration logic 210 receives a new emissions level calibration parameter, such that the calibration logic 210 compares the stored emissions level calibration parameter 208 to this new parameter. In other embodiments, the calibration logic may receive a trim parameter or other value associates with an emissions level calibration parameter (despite not receiving the new emissions level calibration parameter). In this case, the calibration logic 210 compares the associated stored parameter (e.g., trim parameter) with the newly received parameter (i.e., an emissions level calibration parameter comparison by proxy). In yet other embodiments, there may be multiple emissions level calibration parameters associated with various emissions levels (e.g., increasing in stringency). In these scenarios, the calibration logic 210 performs a comparison where the newly received emissions level is considered to "match" the stored emissions level calibration parameter 208 if the newly received emissions level calibration parameter coincides with an emissions tier as stringent or more stringent than the emissions tier associated with the emissions level calibration parameter 208. Thus, an exact match may not be required to still be considered a match and enable a calibration update.

As one example, upon powering up the controller 140 (e.g., the system 100 such as a key-on event for the vehicle that embodies the system 100), the controller 140 (i.e., the calibration logic 210) compares the emissions level calibration parameter 208 to a received calibration level parameter (e.g., via the telematics unit, etc.) to detect if the calibration software of the controller has been tampered with. The calibration logic 210 is configured to determine a tampering event if the receive emissions level calibration parameter from the downloaded calibration does not match the emissions level calibration parameter 208. In the event of a mismatch, the controller may set a fault code, which will then drive the emissions inducements/actions, as described below. The fault would get registered as a tampering fault, however, a user has the opportunity to download the proper calibration before an inducement may begin. These inducements may impede the operator from operating the equipment as they normally would in order to ensure certain emissions from the system.

As yet another example, an operator may take their vehicle in for servicing. A technician may be able to determine which tuning has been done based on that emissions level calibration parameter 208. Based on the emissions level calibration parameter 208, the technician can then determine whether the particular setting in the controller complies with the particular engine market. Further, when the calibrations are uploaded to the cloud before they are sent to the controller via the telematics unit 150, the calibrations may have a corresponding emissions level calibration parameter 208 indicating what tier it would be compatible with to ensure that the newly released calibration transmitted through the cloud to the controller process matches the stored value in the controller.

The engine circuit 212 is structured to communicate with and control, at least partly, the engine 101 based on feedback from the calibration logic 210. In particular, the engine circuit 212 is structured to control one or more operating points (speed, torque, etc.) of the engine 101 when the sensors 125 provide information indicative of the emissions levels. The engine circuit 212 is structured to transmit a command to designate a desired operating point of the engine 101 (e.g., a target torque and/or speed output) in response to data/information regarding the emissions calibration. The engine circuit 212 may command an air-handling actuator, a turbocharger position, an EGR position (e.g., the EGR valve), etc. Additionally, the engine circuit 212 may determine adjustment of the engine 101 is not required. The engine circuit 212 is coupled to the sensors 125.

The engine circuit 212 is configured to communicate with the calibration logic 210 to modulate an engine operating point in response to the comparison by the calibration logic 210 (described above). The engine operating point command controls the engine 101, at least partly, and may include one or more of a torque, speed, fuel rail pressure, fueling commands, etc. As an example and in response to a determined non-match, the engine circuit 212 controls the engine or other components of the system 100 to limit or mitigate emissions (e.g., reduce a maximum allowed power output from the engine). In this example, the engine circuit 212 modulates the engine operating point, specifically the power output from the engine, in response to the tampering alert. The engine operating point command may be a command to control an engine torque (e.g., a desired torque output), an engine speed (a desired engine speed), a fueling command (e.g., injector quantity and timing), an exhaust gas recirculation amount, combinations thereof, and so on. This modulation of the engine operating point may include powering down the engine entirely. As another example, the engine circuit 212 may control an EGR amount, a dosing amount, and other parameters beyond the "engine" in the event of a determined tampering event.

Accordingly, the engine circuit 212 may provide a variety of commands to a variety of components in response to the comparison and a determined mismatch by the calibration logic 210. These actions may be intended to aid compliance with one or more emissions regulations. These actions include imparting a derate event in certain conditions, forced engine shutdowns and so on. For instance, in the occurrence an incorrect emissions tier is detected, the engine power may be derated (a maximum power output is limited from a normal operating allowed power output). As an incentive to remedy the mismatch, the engine circuit 212 can progressively reduce the power output that can be extracted from the engine until the fault is remedied. A manufacturing tool may be used to set this power down parameter. The equipment may return to normal operation once the correct controller calibration software has been reprogrammed to the controller. There also may be an option for an engineering tool to override the power down parameter (e.g., not restore the parameter across software recalibration).

Referring now to FIGS. 3A-3E, graphical depictions of a process that may be implemented by the calibration logic and the engine circuit of the controller of FIGS. 1-2 is shown, according to an example embodiment. In FIGS. 3A-3E, the "ECU" represents the controller 140. The diagrams represent an example process of checking emissions level calibration parameter, detecting a tampering event, and controlling various components based on the comparison and detected tampering event. In FIGS. 3A-3B, the controller 140 is programmed to a specific emissions level calibration parameter during an initial parameter download (i.e., the memory goes from blank on this aspect to including an intended emissions level parameter). As shown in the calibration examples of FIGS. 3A-3B, the controller is programmed at the engine plant by downloading the intended calibration (e.g., Stage V) to a blank controller. Stage V refers to a particular European emissions standard for engines used in off-road applications. After downloading, the emissions level calibration parameter for, in this case a Stage V engine, is stored in the controller (e.g., memory device 206 (FIG. 3B)). Subsequent calibration updates are shown in FIG. 3C where the programmed/stored emissions level calibration parameter remains unchanged. In the event of a software update, the controller 140 (i.e., calibration logic 210) checks if the new software is compliant with its originally intended market based on comparing new parameter to the stored emissions level parameter. This is shown in FIG. 3D before calibration reflash, which refers to an update to the calibration parameter. Here, the new calibration parameter is for a Stage 0 engine while the existing emissions level calibration parameter is for a Stage V engine. If the calibration logic 210 determines that these parameters match, the calibration logic 210 takes no action (does not set a fault code and does not provide a notification to the engine circuit to, e.g., derate the engine). If the calibration logic 210 determines that these parameters do not match, various actions like described above may be implemented (e.g., fault code, engine derate, engine shutdown, etc.). In one embodiment, a notification may also be provided in the form of a malfunction indicator lamp, an alarm, etc. to notify the operator. In this regard, a tampering example is shown in FIGS. 3D-3E. When an incompatible calibration (e.g., Stage 0) is downloaded as a part of a calibration reflash, the controller 140 checks for and detects a mismatch after the calibration reflash and the controller restores the emissions level calibration parameter 208. As such, a fault code may be set and the engine performance is restricted (FIG. 3E).

Thus, this process may be used with a variety of engine types. For example, a Stage V base engine with a controller may be tuned to meet Stage Ma (EPA Tier 3) regulations intended for use in a machine in a Stage Ma emissions market. There may be Stage V base engines offered with Stage IV (EPA Tier 4F), Stage Mb (EPA Tier 4i), Stage Ma (EPA Tier 3), Stage II (EPA Tier 2), or Tier 0 (Unregulated) calibration tuning. In further examples, there may be China Stage IV base engines offered with China Stage III, Stage IV (EPA Tier 4F), Stage Mb (EPA Tier 4i), Stage Ma (EPA Tier 3), Stage II (EPA Tier 2), or Tier 0 (Unregulated) calibration tuning. There may be base engines of the latest product (emissions regulations beyond Stage V) being built with calibration/software tuned to any of the lower emissions regulations as discussed above. The embodiments and innovations described herein may be applicable with all these and other engine types.

The emissions level calibration parameter 208, or label, allows release of multiple products that have the same product ID/label because the engine configuration for the hardware perspective is still the same. Once the expected emissions tier for the controller is determined, the technician who is downloading a specific updated calibration would be able to pick the emission level that matches the one stored in controller 140. Further the calibration logic 210 additionally verifies that the service technician is downloading the calibration into the controller correctly. For instance, if the wrong calibration is released, when that product gets updated, this feature would generate an alert (e.g., a malfunction indicator lamp, an alarm, a word display notification on a display device, etc.) and tell the operator that there is an error with the calibration process and that a new calibration needs to be downloaded. For example, if there was a North America emission compliant product, but the technician accidentally selected a European regulation calibration that's available on the network and download that into the engine's controller, at that point this particular feature would flag that as being an issue. Additionally, if these units are being exported to alternate emission markets, that particular engine's serial number may be certified to a new emissions level. As such, the verification feature may be deactivated for that specific engine's serial number. For instance, if an operator wants to get a higher rating power out of the engine when they put a bigger turbocharger in, they have to put in new tuning with emissions to match that higher power needs. At the same time, if they get the calibration which is also tuned for that market, the calibration logic 210 will not flag it as an issue. However, if the operator was able to download a calibration which has that higher tuning and better performance, but it is intended for a lagging emissions market, then it will be flagged as tampering and a mismatch in the emissions tier (by the controller 140). As such, an operator is not prevented from going from a lower power to a higher power rating as so long as the critical parts list match, but an operator will be prevented from putting a lower tiered emissions calibration on a higher tier.

Referring now to FIG. 4, a method 400 for enforcing an emissions certification level is shown, according to an exemplary embodiment. The method may be performed by the components of FIGS. 1-3, such that reference may be made to them to aid explanation of the method 400. At process 402, a controller is configured with an intended emissions level calibration parameter. For instance, the calibration logic 210 can set an emissions level calibration parameter to a desired emissions level based on one or more inputs from a telematics unit (or directly during the manufacturing process). At process 404, the controller receives a request to recalibrate the calibration logic (e.g., the emissions level calibration parameter) with a designated parameter. For instance the new emissions level calibration parameter may be an updated emissions regulation requirement. However, a calibration reflash could include other updates due to performance and/or product improvement as well. The new emissions level calibration parameter may be sent to the vehicle from the telematics unit or from a service tool. This may be service provider initiated, user initiated, manufacturer initiated, etc. Once received, the controller 140 compares the intended emissions level calibration parameter and the new emissions level calibration parameter. At process 406, the controller determines whether the new emissions level calibration parameter matches the intended emissions level calibration parameter. Based on the determination, the controller generates an alert at process 408. For instance, if a mismatch between the emissions level calibration parameters is detected, an alert is generated (e.g., fault code, malfunction indicator lamp on a vehicle dashboard, etc. by the controller 140). However, if the new emissions level calibration parameter matched the intended emissions level calibration parameter, no alert is generated and the engine and system may continue operating normally. If an alert is generated, the controller may modulate the engine (or another component) at process 410 to aid emissions regulations compliance. As such, the operating point of the engine is adjusted. As discussed herein, that may include decreasing the power output of the engine 101, or shutting off the engine, as an incentive for the operator to remedy the fault and meet the appropriate emissions level (e.g., emissions level calibration parameter). At process 412, a compliant emissions level calibration parameter is downloaded. Once the controller has been updated with the compliant emissions level calibration parameter matching the emissions level calibration parameter programmed in the controller, the controller modulates the engine again at process 414. For instance, the engine will return to normal operation.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A "coupled" to circuit B may signify that the circuit A communicates directly with circuit B (i.e., no intermediary) or communicates indirectly with circuit B (e.g., through one or more intermediaries).

While various circuits with particular functionality are shown in FIG. 2, it should be understood that the controller 140 may include any number of circuits for completing the functions described herein. For example, the activities and functionalities of the calibration logic 210 and the engine circuit 212 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
an exhaust aftertreatment system coupled to an engine; and
a controller comprising at least one processor coupled to at least one memory device storing instructions that, when executed by the at least one processor, cause the controller to perform operations including:
store a first emissions level calibration parameter in a portion of the at least one memory device inaccessible to recalibration sequences;
receive a second emissions level calibration parameter;
compare the first emissions level calibration parameter to the second emissions level calibration parameter;
generate an alert based on the comparison; and
based on the comparison indicating a mismatch between the first emissions level calibration parameter and the second emissions level calibration parameter, implement an inducement including at least one of limiting a speed of the engine, limiting a torque of the engine, or shutting off the engine.

2. The system of claim 1, wherein the controller performs further operations including restoring the first emissions level calibration parameter based on a powering on and off of the controller.

3. The system of claim 2, wherein saving the first emissions level calibration parameter to the at least one memory device includes configuring the first emissions level calibration parameter as being non-erasable such that the first emissions level calibration parameter is retained through a plurality of recalibrations.

4. An apparatus comprising:
one or more processing circuits comprising one or more memory devices coupled to one or more processors, the one or more memory devices configured to store instructions thereon that, when executed by the one or more processors, cause the one or more processors to:
receive a first emissions level calibration parameter;

store the first emissions level calibration parameter in a secure location of the one or more memory devices that is inaccessible to recalibration sequences;

receive a flash or erase data command;

restore the first emissions level calibration parameter after receiving the flash or erase data command;

receive a requested recalibration parameter;

determine a requested emissions level calibration parameter associated with the requested recalibration parameter;

compare the requested emissions level calibration parameter and the first emissions level calibration parameter; and based on the comparison indicating a mismatch between the first emissions level calibration parameter and the requested recalibration parameter, implement an inducement including at least one of limiting a speed of an engine, limiting a torque of the engine, or shutting off the engine.

5. The apparatus of claim 4, wherein the inducement further includes generating a fault code.

6. The apparatus of claim 4, wherein the one or more memory devices are further configured to store instructions thereon that, when executed by the one or more processors, cause the one or more processors to:

receive a corrected recalibration parameter after receiving the requested recalibration parameter;

determine a corrected emissions level calibration parameter associated with the corrected recalibration parameter;

compare the corrected emissions level calibration parameter and the first emissions level calibration parameter; and remove the inducement and restore original functionality when the corrected emissions level calibration parameter complies with the first emissions level calibration parameter.

7. The apparatus of claim 4, wherein the requested recalibration parameter includes at least one of a trim parameter or an operating system parameter.

8. The apparatus of claim 4, wherein the flash or erase data command includes a shutdown of power to the one or more processors, and wherein the first emissions level calibration parameter is restored after power is restored to the one or more processors.

9. The apparatus of claim 4, wherein the secure location of the one or more memory devices is non-erasable.

10. A system, comprising:

an exhaust aftertreatment system; and a controller coupled to the exhaust aftertreatment system, the controller configured to:

receive a first emissions level calibration parameter;

store the first emissions level calibration parameter in a secure location of the controller that is inaccessible to recalibration sequences;

receive a requested recalibration parameter;

determine a requested emissions level calibration parameter associated with the requested recalibration parameter;

compare the requested emissions level calibration parameter and the first emissions level calibration parameter;

based on the comparison indicating a mismatch between the requested emissions level calibration parameter and the first emissions level calibration parameter, implement an inducement including at least one of limiting a speed of an engine, limiting a torque of the engine, or shutting off the engine;

implement the requested recalibration parameter when the requested emissions level calibration parameter complies with the first emissions level calibration parameter;

receive a flash or erase data command; and restore the first emissions level calibration parameter after receiving the flash or erase data command.

11. The system of claim 10, wherein the requested recalibration parameter includes at least one of a trim parameter or an operating system parameter.

12. The system of claim 10, wherein the flash or erase data command includes a shutdown of power to the controller, and wherein the first emissions level calibration parameter is restored after power is restored to the controller.

13. The system of claim 10, wherein the secure location of the controller includes a memory device of the controller that is non-erasable.

14. The system of claim 10, wherein the controller is further configured to:

generate an alert when the requested emissions level calibration parameter does not comply with the first emissions level calibration parameter.

* * * * *